United States Patent [19]
DiFrank et al.

[11] Patent Number: 5,824,128
[45] Date of Patent: Oct. 20, 1998

[54] GLASS GOB SHEARING APPARATUS WITH IMPROVED CUSHIONING OF SHEAR BLADE CARRIAGES

[75] Inventors: Frank J. DiFrank; Andrew B. Menzie, both of Toledo, Ohio

[73] Assignee: Owens-Brockway Glass Container Inc., Toledo, Ohio

[21] Appl. No.: 839,894

[22] Filed: Apr. 18, 1997

[51] Int. Cl.[6] .................................................. C03B 7/10
[52] U.S. Cl. .................. 65/159; 65/133; 65/334
[58] Field of Search ............................ 65/133, 159, 332, 65/334

[56] References Cited

U.S. PATENT DOCUMENTS

| | | | |
|---|---|---|---|
| 2,225,899 | 12/1940 | Benoit et al. | 65/159 |
| 3,567,418 | 3/1971 | Hoette | 65/325 |
| 4,174,647 | 11/1979 | Dahms | 83/58 |
| 4,396,411 | 8/1983 | Winzer | 65/334 |
| 4,499,806 | 2/1985 | Mumford | 83/527 |
| 4,699,643 | 10/1987 | Kulig | 65/332 |
| 4,728,354 | 3/1988 | Vilk et al. | 65/334 |
| 4,813,994 | 3/1989 | Kulig | 65/334 |
| 5,573,570 | 11/1996 | Leidy et al. | 65/334 |

Primary Examiner—Stanley S. Silverman
Assistant Examiner—Sean Vincent

[57] ABSTRACT

A parallel shear apparatus for sequentially shearing each of a plurality of streams of molten glass from a glass feeder into gobs for processing into glass containers by a glass forming machine. The apparatus has first and second opposed carriages which are reciprocable along parallel slides toward and away from one another, each of the carriages carrying one or more opposed knife elements, corresponding to the number of streams of molten glass, and the opposed knife elements overlap at the innermost limits of their travel to perform the shearing action. Motion of the carriages is actuated by a unidirectionally acting servo motor, which imparts oscillating motion to a bell crank through a connecting rod. The oscillating motion of the bell crank imparts simultaneous, opposed, rectilinear motion to the carriages through connecting rods, which are pivotally attached to the servo motor at diametrically spaced apart locations. The servo motor is mounted on a pivoting bracket that is urged to its normal operating position by a pneumatic cylinder and is spring biased away from its normal operating position in the event of a stoppage. The pneumatic cylinder is cushioned to minimize shock loads caused by a sudden retraction of the servo motor mounting bracket and is adjustably mounted relative to fixed structure of the shear apparatus.

8 Claims, 8 Drawing Sheets

PRIOR ART

GLASS GOB SHEARING APPARATUS WITH IMPROVED CUSHIONING OF SHEAR BLADE CARRIAGES

CROSS-REFERENCE TO RELATED PATENT

This application is directed to improvements in glass gob shearing apparatus of the type described in U.S. Pat. No. 5,573,570 (Leidy et al.), the disclosure of which is incorporated herein by reference.

FIELD OF THE INVENTION

This invention relates to apparatus for sequentially shearing each of a multiplicity of streams of molten glass into individual gobs. More particularly, this invention relates to apparatus of the foregoing character in which opposed sets of shearing knife elements are simultaneously moved toward and away from one another along opposed, rectilinear paths to overlap in shearing relationship approximately at the longitudinal central axes of the streams of molten glass that are being sheared.

BACKGROUND OF THE INVENTION

In the manufacture of glass containers by a forming machine of the I.S. ("individual section") type, one or more streams of molten glass flow downwardly from a feeder bowl of a glass melting furnace forehearth toward a section of the molding machine, and each stream is severed or sheared into a multiplicity of individual gobs by a shearing device positioned between the feeder bowl and the molding machine section. A typical shearing device of the foregoing character includes an opposed set of shear knife elements, each set of shear knife elements being mounted on a carriage assembly, and driving apparatus for reciprocating each of the carriage assemblies toward and away from one another. A shearing device of this general character is disclosed in U.S. Pat. No. 4,813,994 (Kulig). Heretofore, such driving apparatus typically utilized a mechanical cam arrangement in the driving of the carriage assemblies. Such a cam arrangement inherently is limited in the speed that can be imparted to the carriage assemblies, and this speed limitation can act as a capacity limitation on the forming machine. Further, in such a cam arrangement the contact time between the shear knife elements and the glass stream(s), which is an important factor in the quality of the shearing action, cannot be adjusted without suspending the operation of the forming machine to permit a change in the cams.

The foregoing and other problems and limitations of shearing devices for use with I.S. glass container forming machines were overcome with the shearing apparatus of the invention of the aforesaid U.S. Pat. No. 5,573,570, which uses a unidirectionally acting servo motor connected to an arm or throw of a bell crank to drive the opposed shear knife carriage assemblies of the shearing apparatus through separate connecting rods. Such a drive arrangement imparts harmonic movement characteristics to the shear knife carriages. Further, with such a drive arrangement control of the operating speed of the servo motor, and control of the degree of overlap of the knife elements in their shearing portions, can be made during the operation of the shear device. As a result of these control characteristics, close control of the "time under glass" of the shear device, that is, the contact time between the molten glass stream(s) and the shear knife elements, is provided. Further still, control of the speed of the servo motor can be very conveniently integrated with control of the positions of the needles that are used in conjunction with the feeder orifices to control the rate of glass flow from the feeder orifices.

Shearing apparatus of the type disclosed in the aforesaid U.S. Pat. No. 5,573,570 must be capable of coming to a complete stop and the servo motor that drives the oscillating shear blade carriages of such apparatus must then be moved to a fully retracted position together with the shear blade carriages which are then also retracted. The servo motor apparatus of the aforesaid U.S. Pat. No. 5,573,570, which is urged to its normal operating position by a pneumatic cylinder, is urged from its normal operating position by a tension spring that acts against the force from the pneumatic cylinder. It has been found, however, that stopping of such shearing apparatus can be very sudden, resulting in high impact loads on the elements of the pneumatic cylinder and other elements of the shearing apparatus due to the inertia of the shear carriages as they are being retracted from their operating positions.

Further, the piston end of the servo motor retracting pneumatic piston of the shear apparatus of the aforesaid U.S. Pat. No. 5,573,570 was fixed in relation to the support structure of such apparatus. It has been found, however, for precise adjustment of the operating positions of the shear blades of the apparatus, that it is important that the piston end of such pneumatic piston be adjustable in position relative to such support structure.

SUMMARY OF THE INVENTION

According to the present invention there is provided a parallel shear apparatus generally in accordance with that disclosed in the aforesaid U.S. Pat. No. 5,573,570 but with a pneumatic cylinder for retracting the shear carriage from its normal operating position that is cushioned to reduce impact or shock loads on the cylinder and the structure to which it is mounted due to a sudden retraction of the servo motor as a result of a stoppage of the apparatus. Further, the piston end of the servo motor retraction pneumatic cylinder of the parallel shear apparatus of the present invention is adjustable in its position relative to other structure of the shear apparatus for more precise positioning of the operating positions of the opposed set of shear blades relative to one another.

Accordingly, it is an object of the present invention to provide an improved parallel shear device for a glass forming machine of the individual section type. More particularly, it is an object of the present invention to provide for improved retraction of the elements of a shear device of the foregoing character in the event of a stoppage of production. It is also an object of the present invention to provide a parallel shear device of the foregoing character in which the overlap of the shearing knife elements, in their shearing positions, can be conveniently and more precisely adjusted without suspending operation of the forming machine that is associated with such shear device.

For a further understanding of the present invention and the objects thereof, attention is directed to the drawing and the brief description thereof, to the detailed description of the preferred embodiment of the invention, and to the appended claims.

DETAILED DESCRIPTION OF THE PREFERRED EMBODIMENT

Figure 1:
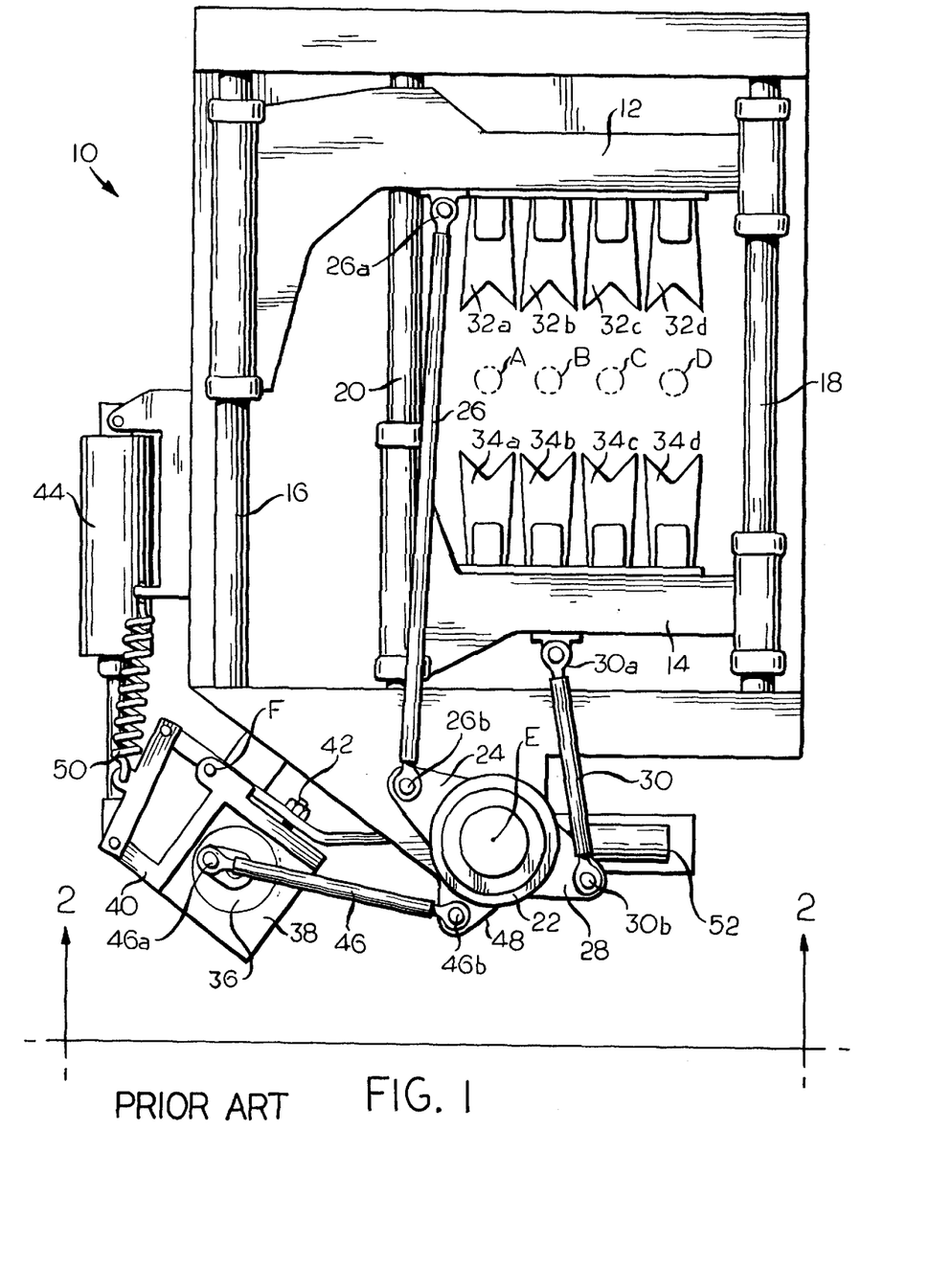
FIG. 1 is a plan view of a parallel shear apparatus for a glass forming machine, the parallel shear apparatus depicted therein incorporating the invention of the aforesaid U.S. Pat. No. 5,573,570.

A parallel shear apparatus or device according to the embodiment of the present invention illustrated in FIGS. 1–4 is indicated generally by reference numeral 10 in FIG. 1 and includes opposed shear knife carriages 12 and 14. The carriages 12 and 14 are mounted for reciprocating motion toward and away from one another, the carriage 12 being slidable along stationary slide rods 16 and 18 and the carriage 14 being slidable along stationary slide rods 18 and 20.

The motion of the carriages 12 and 14 is rectilinear, and is simultaneously actuated by an oscillating bell crank 22. In that regard, the carriage 12 is connected to a throw 24 of the bell crank 22 by a connecting rod 26, an end 26a of which is pivotally attached to the carriage 12 and the other end 26b of which is pivotally attached to the throw 24 of the bell crank 22. Likewise, the carriage 14 is connected to a throw 28 of the bell crank 22 by a connecting rod 30, an end 30a of which is pivotally attached to the carriage 14 and the other end 30b of which is pivotally attached to the throw 28, the throws 24 and 28 being diametrically opposed to one another in their positions in relation to the bell crank 22.

The carriage 12 carries one or more shear knife elements, shown as four shear knife elements 32a, 32b, 32c and 32d, one for each of the molten glass streams flowing from the glass feeder thereabove (not shown) with which the shear mechanism 10 is associated. Similarly, the carriage 14 carries a like number of shear knife elements, shown as shear knife elements 34a, 34b, 34c and 34d. As the bell crank 22 is caused to oscillate, by means which will hereinafter be described more fully, the carriages 12 and 14 are caused to move toward and then away from one another, to periodically bring the opposed shear knife elements, 32a and 34a, 32b and 34b, 32c and 34c, and 32d and 34d, respectively, into partly overlapping relationship with one another to thereby shear streams of molten glass flowing downwardly therebetween, at the locations identified by the broken line circles A, B, C and D, respectively. This action of the carriages 12, 14, and the shear knife elements carried by each of them, will separate the molten glass streams at the locations A, B, C and D, respectively, into individual glass gobs for further processing into individual glass containers by a glass forming machine of the individual section type, not shown, which is positioned below the shear mechanism 10.

The motion imparted to the carriages 12, 14 by the bell crank 22 through the connecting rods 26, 30 will be harmonic in its velocity and acceleration characteristics. This will minimize inertial loads on the carriages 12, 14 and thereby minimize wear on them.

The bell crank 22 is caused to oscillate about its central axis E by a unidirectionally acting a.c. servo motor 36, gear reducer 38 combination, which is mounted on a bracket 40 that is pivoted in relation to the fixed structure of the shear mechanism 10 about a central axis F. The bracket 40 is biased against an adjustable stop 42 by a double acting pneumatic cylinder 44, and the position of the bracket 40, which is fixed in relation to the position of the central axis E of the bell crank 22, determines the amount or degree of overlap of the knife elements 32a and 34a, etc., at the innermost limits of their rectilinear motion. Thus, the degree overlap of the knife elements in their shearing position may be rapidly and easily made while the shear mechanism 10 is operating, without the need to interrupt the operation of the associated forming machine. The rotational movement of the servo motor 36 is transmitted to the bell crank 22 by a connecting rod 46, an end 46a of which is pivotally attached to the servo motor 36 at a location away from the axis of rotation of the servo motor 36, and the other end 46b of which is pivotally attached to a throw 48 of the bell crank 22 at a location between, and spaced from each of, the throws 24 and 28.

Failsafe operation of the shear mechanism 10 is ensured by providing a tension spring 50, which acts on the bracket 40 to retract the bracket 40 about its pivot axis F from its location against the adjustable stop 42 in the event of a loss of air pressure in the cylinder 44. Thus, the spacing between the carriages 12 and 14 will be increased to the point where there will be no overlap between their opposed knife elements, 32a and 34a, etc., even at the innermost limits of their travel, until proper operating conditions can be restored. A pneumatic safety latch mechanism 52 is also provided to latch the bell crank 22 against oscillating motion in the event of the loss of air pressure to the cylinder 44 or the loss of power to or failure of the servo motor 36.

Figure 3:
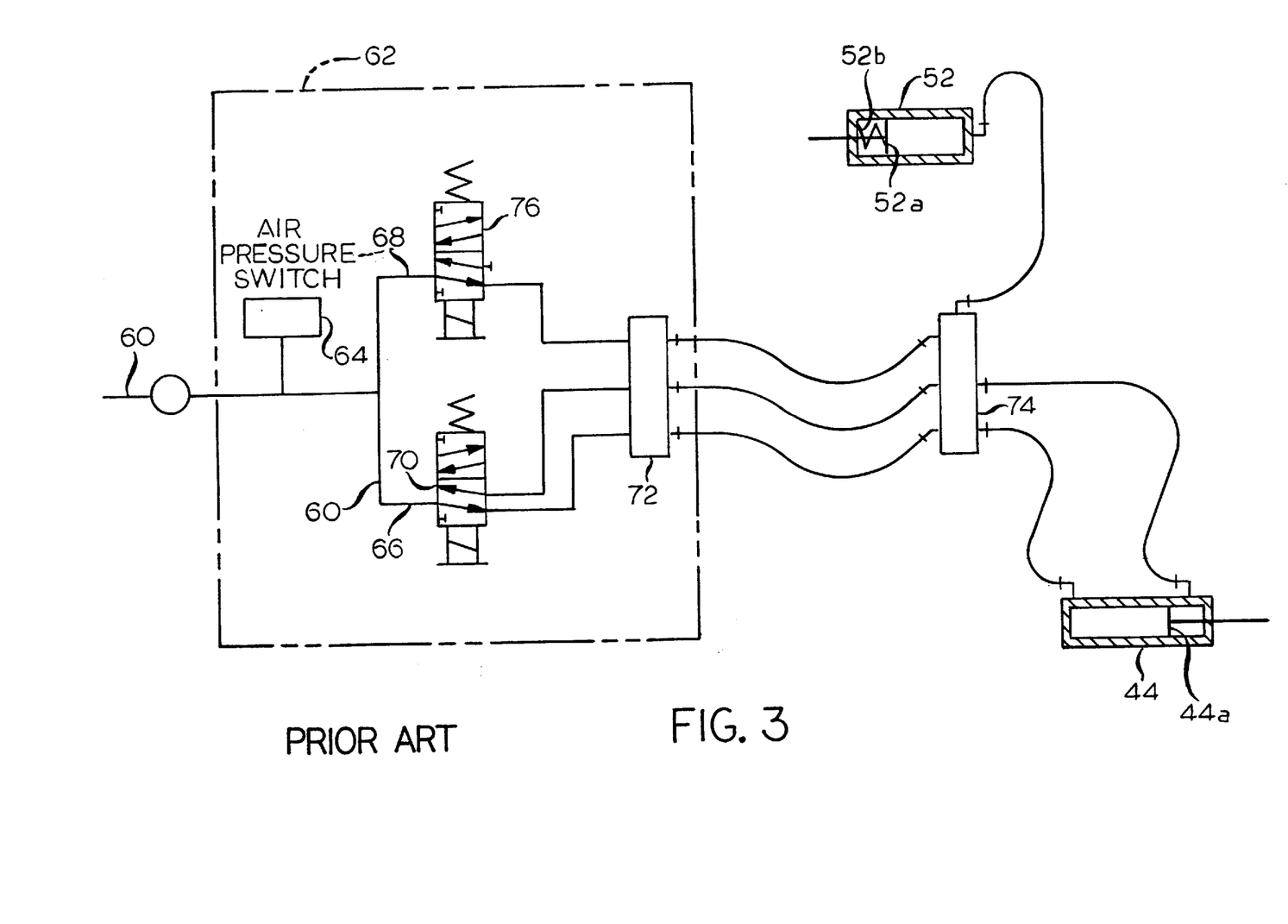
FIG. 3 is a schematic view of the pneumatic circuitry for actuating the pneumatic operators of the apparatus of FIGS. 1 and 2.

The pneumatic circuitry for the operation of the cylinder 44 and the pneumatic latch mechanism 52 is illustrated in FIG. 3, and utilizes a supply of clean, regulated pressurized air in a supply line 60. Air in the supply line 60 enters a control cabinet 62, within a structure whose limits are indicated by a broken line, and the control cabinet 62 incorporates a pressure switch 64. The pressure switch 64 acts to break the flow of air through the supply line 60 in the event that the flow of air through the supply line falls below a predetermined value. The compressed air in the supply line 60 is delivered, at locations downstream of the pressure switch 64, to a first branch line 66 and a second branch line 68.

The pressurized air in the branch line 66 is delivered to one or another of the operating sides of a piston 44a of the double acting cylinder 44 through a solenoid valve 70 from a supply manifold 72 in the control cabinet 62 and a second supply manifold 74 which is external to the control cabinet 62. The solenoid valve 70 is a two-position valve of a conventional type, and its operating position is electrically or electronically controlled, for example, by wiring it into the emergency shutoff circuitry, not shown, for the shear device 10, to move the solenoid valve to its non-operating position and thereby cause the piston 44a of the cylinder 44 to move to advance the bracket 44 against the adjustable stop 42.

The pressurized air in the branch line 68 is delivered to the only operating side of a piston 52a of the single acting safety latch 52 through a solenoid valve 76, the supply manifold 72 and the second supply manifold 74. The solenoid valve 76, like the solenoid valve 70, is a two-position valve of a conventional type, and its operating position is similarly electrically or electronically controlled to move the solenoid valve to a non-operating position in the event of an emergency and thereby to permit a spring 52b of the pneumatic safety latch 52 to bias the piston 52a from its non-engaged position, as depicted in FIG. 3, to its engaged position, in which it will block the oscillation of the bell crank 22.

Figure 2:
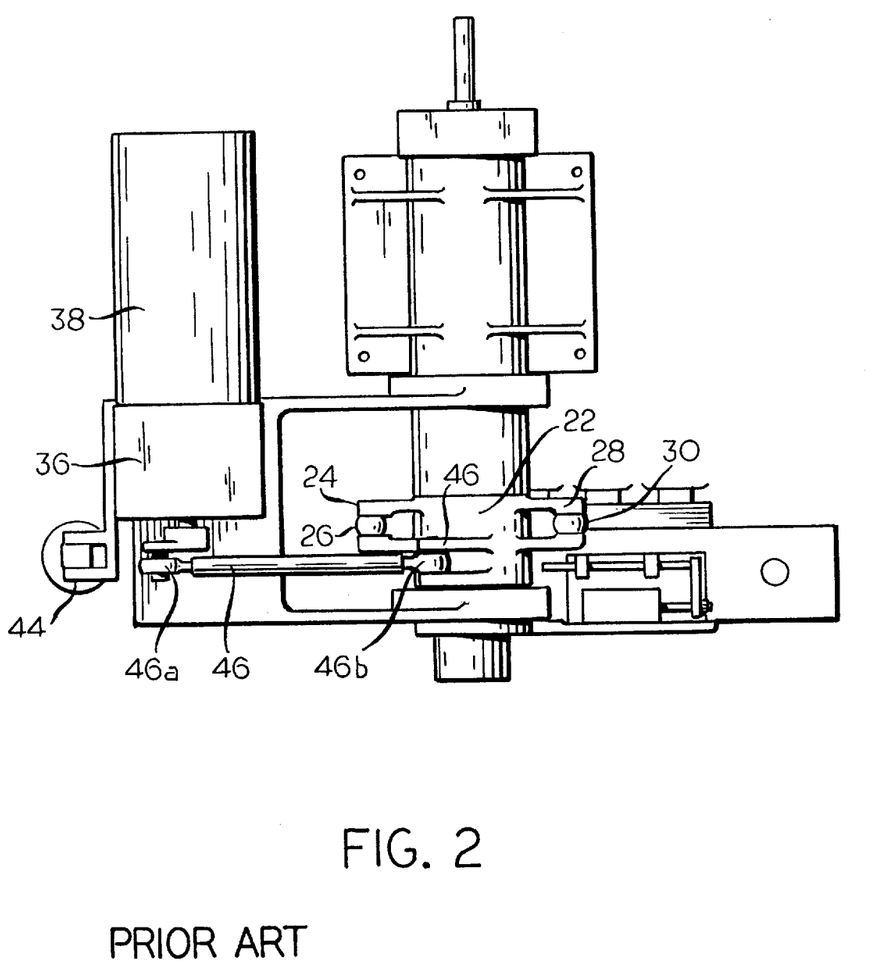
FIG. 2 is an elevational view of the apparatus of FIG. 1 taken on line 2—2 thereof.
Figure 4:
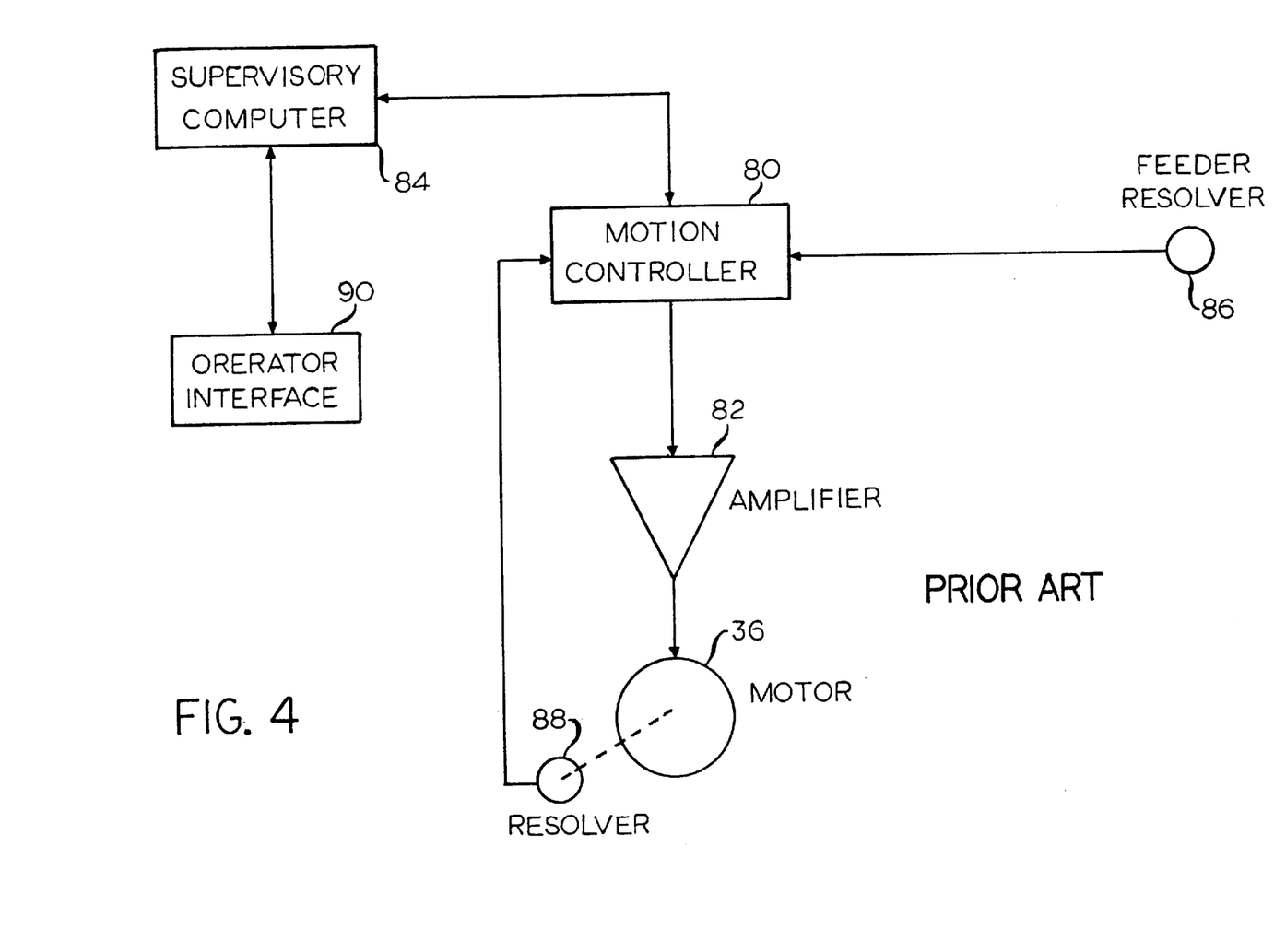
FIG. 4 is a schematic view of the control system for controlling the operation of the electrical motor of FIGS. 1 and 2.

Control of the operation of the apparatus of FIGS. 1–3, as heretofore described, can be accomplished by means of the control system that is illustrated in FIG. 4. As shown, the operation of the a.c. servo motor 36 is controlled by a motion controller 80 which acts on the servo motor 36 through a power amplifier 82. The motion controller 80, which acts under the command of a supervisory computer 84, has in its memory a motion profile which is generated by the supervisory computer 84, and this memory profile determines the position of the knife elements 32a, 34a, etc., in relation to the needles of the feeder bowl (not shown). In achieving this control result, the motion controller utilizes a signal indicative of the positions of the needles, as received from a resolver or feedback device 86, such as the resolver which is described in U.S. Pat. No. 4,427,431 (Mumford) and a signal indicative of the position of a rotor of the servo motor 36, as received from a second resolver or feedback device 88 of a similar nature. In that regard the resolver 86 is preferably mounted in the same place where the shear cam for prior art mechanical shears would be located, and in such an arrangement provides a signal indicative of the absolute position of the output shaft of the gearbox that is used to control the movement of the needles. Likewise, the resolver 88 is preferably mounted on the back of the servo motor 36, and in such an arrangement will serve to provide a signal indicative both of the position of the rotor of the servo motor 36 and of the positions of the carriages 12, 14.

In a control system as described, the supervisory computer 84 will calculate a motion profile for the motion controller 80 based on the speed of the associated forming machine and the desired "time under glass" for the knife elements 32a, 34a, etc., of the parallel shear apparatus 10. Thus, this motion profile will control the position to position relationship between the output shaft of the feeder needle gearbox and the desired positions of the knife elements 32a, 34a, etc. This relationship can be readily changed, when desired, by an operator through an operator interface 90, which permits rapid reprogramming of the supervisory computer 84.

A parallel shear apparatus or device according to a modified embodiment of the invention of FIGS. 1–4 is illustrated in FIGS. 5–8, wherein elements that correspond to the elements of the embodiment of FIGS. 1–4 are identified by a 100 series numeral, the last two digits of which correspond to the two digits of the corresponding elements of the embodiments of FIGS. 1–4.

The embodiment of a parallel shear apparatus or device according to the embodiment of the present invention illustrated in FIGS. 5–8 is indicated generally by reference numeral 110, and corresponds to the parallel shear apparatus 10 of FIGS. 1–4, except as hereinafter described. The parallel shear apparatus 110 is shown in its relationship to a feeder bowl BL of an associated forehearth, shown in broken line in FIG. 5 only, and has an opposed pair of shear knife carriages, not shown, which are caused to advance toward and away from one another by an oscillating bell crank 122. Reciprocating motion is imparted to the shear knife carriages by connecting rods 126 and 130, an end 130b of the connecting rod 130 being pivotably attached to a throw 128 of the bell crank 122 and an end 126b of the connecting rod 126 being pivotably attached to a throw 124 of the bell crank 122. In that regard, the throws 124 and 128 of the bell crank 122 are diametrically opposed to one another in their positions in relation to the bell crank 122, and the motion imparted to the opposed shear knife carriages by the bell crank 122 through the connecting rods 126, 130 will be harmonic in its velocity and acceleration characteristics, to minimize inertia loads on the shear knife carriages and thereby minimize wear on them.

The bell crank 122 is caused to oscillate about its central axis E by a unidirectionally acting a.c. servo motor 136, gear reducer 138 combination, which is mounted on a bracket 140 that is pivoted in relation to the fixed structure of the shear mechanism 110 about a central axis F. The bracket 140 is biased against an adjustable stop 142 by a double acting pneumatic cylinder 144. Rotary motion of the servo motor 136 is converted to oscillating motion of the bell crank 122 by connecting the servo motor 136 to a throw 148 of the bell crank 122 by a connecting rod 146, an end 146a of the connecting rod 146 being pivotably attached to the servo motor 136 at a location away from the axis of rotation of the servo motor 136, and an end 146b of the connecting rod 146 being pivotably attached to the throw 148 of the bell crank 122 at a location between, and spaced from each of, the throws 124 and 128.

Figure 5:
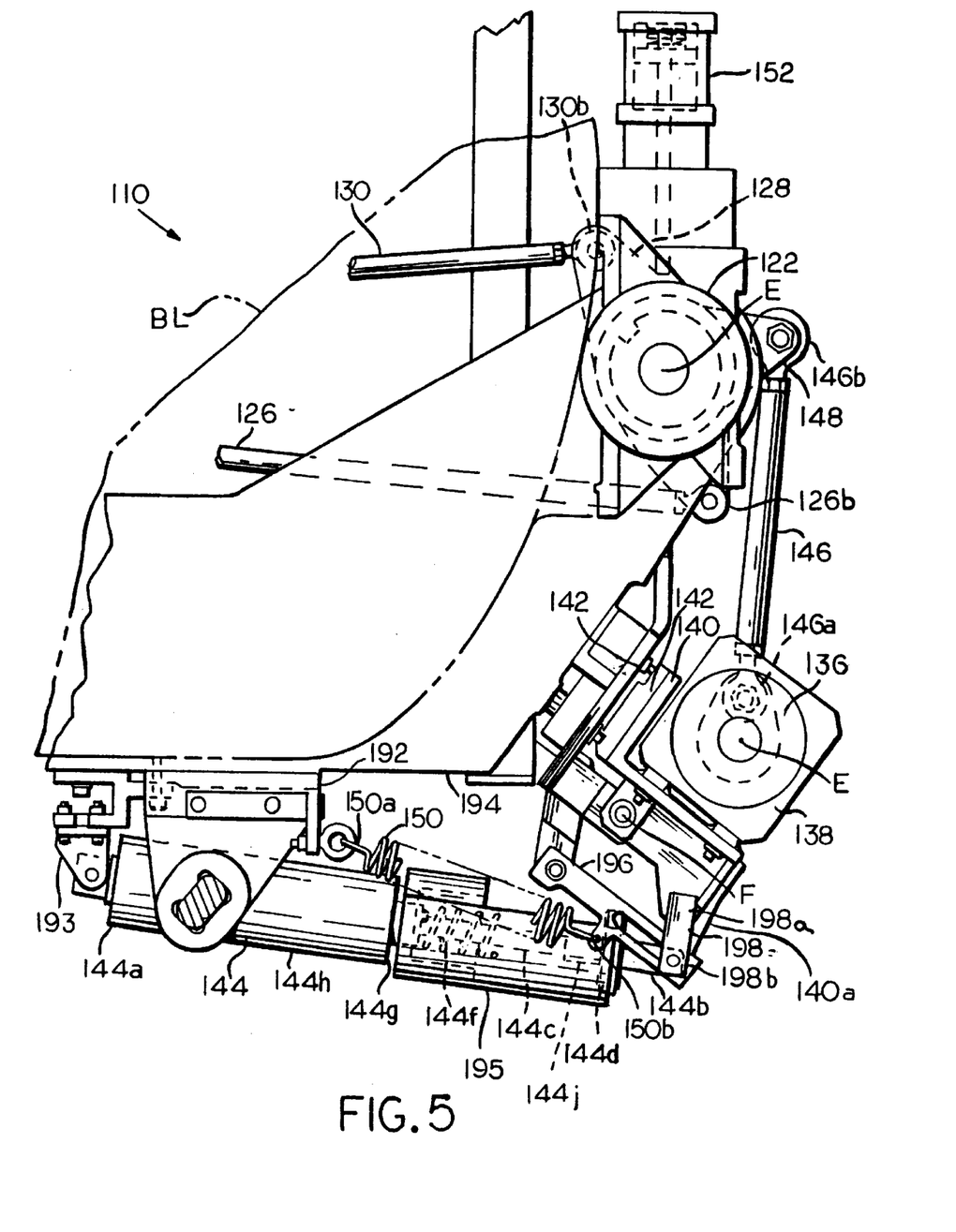
FIGS. 5, 6 and 7 are fragmentary plan views of a modified embodiment of a parallel shear apparatus for a glass forming machine according to the present invention in different operating positions of such apparatus.
Figure 6:
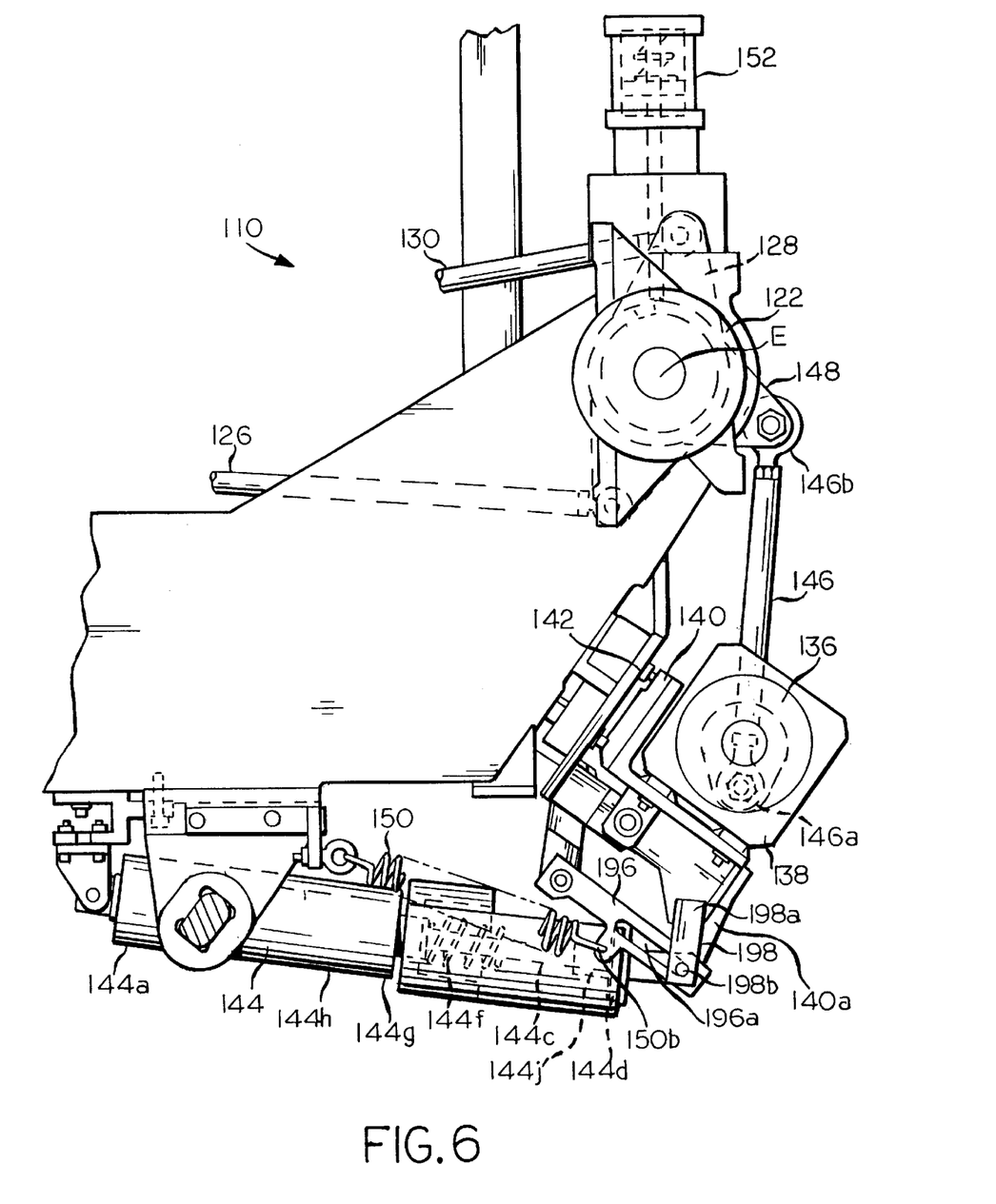

Failsafe operation of the shear mechanism 110 is ensured in the event of a stoppage, or otherwise, by providing a tension spring 150. An end 150a of the spring 150 is secured to a bracket 192 that is fixedly mounted to a frame 194 with respect to which the carriages that are reciprocated by the oscillating motion of the bell crank 122. Another end 150b of the spring 150 is secured to a pivotable link 196, and pivoting motion of the link 196 is transmitted to the pivoting bracket 140 by a second pivotable link 198, an end 198a of which is pivotably secured to the bracket 140 and another end 198b of which is slidable in a slot 196a of the link 196. The cylinder 144 has a piston end 144a that is pivotably mounted to a mounting bracket 193, and the cylinder 144 further has a rod end 144b that is pivotably secured to the end 198b of the link 198. Thus, expansion of the cylinder 144 is effective to pivot the bracket 140 against the stop 142, as shown in FIGS. 5 and 6, which is the normal condition of the bracket 140 when the shear device 110 is in operation. In that regard, FIG. 5 shows the condition of the shear device 110 when the carriages which are actuated by the connecting rods 126 and 130 are at the innermost limits of their normal reciprocating motions, and FIG. 6 indicates the condition of the shear device 110 when the shear carriages which are actuated by the connecting rods 126 and 130 are at the outermost limits of their normal paths of reciprocation.

Figure 7:
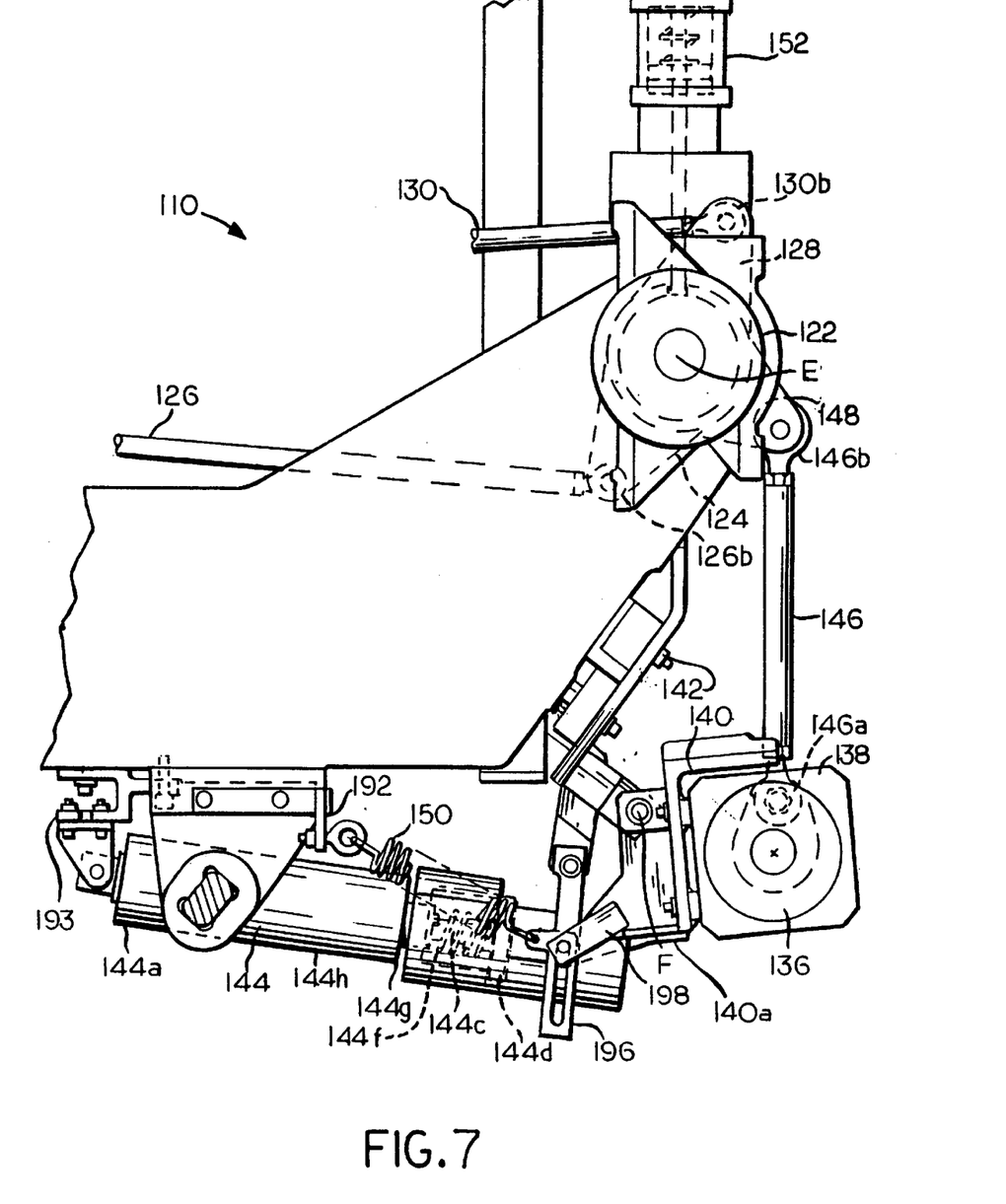
Figure 8:
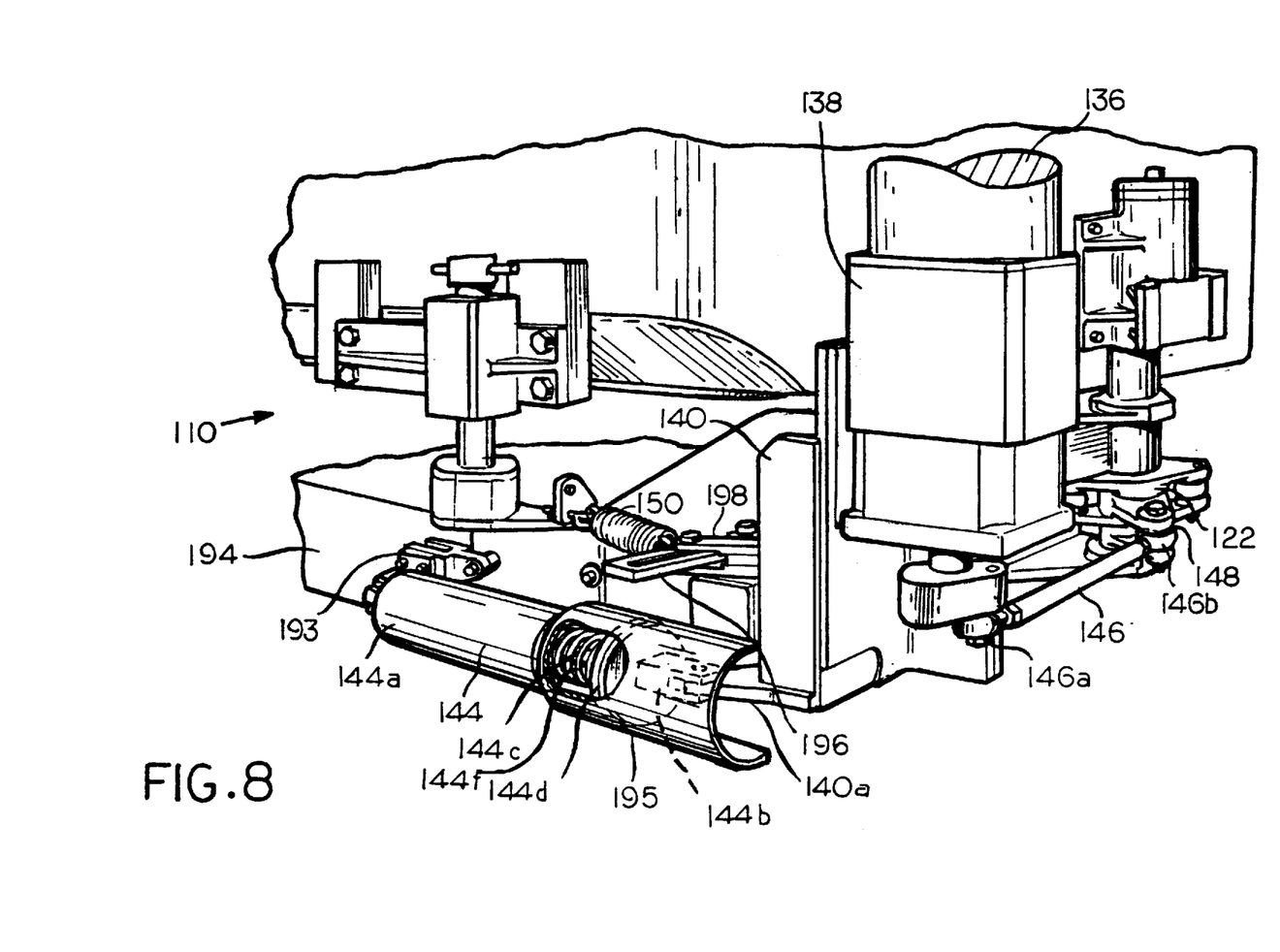
FIG. 8 is a fragmentary perspective view of the apparatus of FIGS. 5, 6 and 7.

When it is desired to stop the operation of the shear device 110, either manually or automatically, the pneumatic pressure to the cylinder 144 is discontinued, allowing the spring 150 to pivotably retract the bracket 140 about its axis F to the condition illustrated in FIG. 7, at which time the space between the carriages operated by the connecting rods 126 and 130 will be substantially greater than the spacing in the condition illustrated in FIG. 6. Because of the inertia of the carriages operated by the connecting rods 126 and 130, a sudden stopping of the shear device 110, which will cause it to assume the condition illustrated in FIG. 7, can impose rather substantial shock loads on various elements of the shear device 110. To absorb the shock loads that otherwise would result from a sudden stoppage of the shear device 110, a cylinder rod portion 144c of the cylinder 144 is provided with a rod clevis 144b and an annular free end portion 144j of which is fixedly secured to a free end of the cylinder rod portion, the rod clevis 144b having an annular collar portion 144d formed as an integral element thereof. A compression spring 144f circumscribes the rod portion 144c between the collar portion 144d and an end 144g of a housing 144h. Thus, as the shear device 110 moves to its stopped, FIG. 7 condition, the collar 144d engages, and begins to compress, the spring 144f, to thereby absorb the shock loads that would otherwise be imposed on various elements of the shear device 110. A part cylindrical shield 195 is provided to shield the exposed end of the rod 144c and the spring 144f from external contact. The rod clevis 144b is also provided, as an integral element thereof, with a clevis portion: that pivotably engages an arm portion 140a of the bracket 140 to retract the bracket 140 about the axis P from its position of FIGS. 5 and 6 to its FIG. 8 position. The use of a single piece rod clevis 144b has been found to facilitate position adjustments of the parallel shear apparatus 110 and to prevent damage that could otherwise occur due to improper adjustments.

To permit precise adjustments of the operating and stopped conditions of the bracket 140, the bracket 193 to which the cylinder 144 is mounted is adjustably secured to the bracket 192.

A pneumatic safety latch mechanism 152 is also provided to latch the bell crank 122 against oscillating motion in the event of the lose of air pressure to the cylinder 144 or the loss of power to or failure of the servo motor 136.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. In an apparatus for shearing at least one stream of molten glass from a glass feeder into individual gobs of molten glass for processing into glass containers in a forming machine, said apparatus having first shearing means, second shearing means, and mounting means for mounting said first shearing means for motion toward and away from said second shearing means and for mounting said second shearing means for parallel motion toward and away from said first shearing means, means for imparting reciprocating motion to the first shearing means and the second shearing means comprising:

a unidirectionally acting servo motor;

a bell crank having a central axis;

first connecting rod means connecting said servo motor to said bell crank for imparting oscillating motion to said bell crank about its central axis;

second connecting rod means connecting said bell crank to said first shearing means;

third connecting rod means connecting said bell crank to said second shearing means;

said second connecting rod means and said third connecting rod means being pivotably attached to said servo motor at spaced apart locations thereof;

a pivoting bracket;

said servo motor being mounted on said pivoting bracket;

an adjustable stop means for controllably limiting the pivoting movement of said pivoting bracket in a first direction;

pneumatic means for biasing said pivoting bracket against said adjustable stop means;

means for cushioning said pneumatic means to absorb shock loads on said apparatus; and spring means acting on said pivoting bracket to retract said pivoting bracket from said adjustable stop means.

2. An apparatus according to claim 1 wherein said pneumatic means comprises:

a pneumatic cylinder having a piston end and a cylinder rod with a rod end, said rod end being pivotably attached to said pivoting bracket;

rod clevis means having a collar for pivotably connecting said cylinder rod to said pivoting bracket; and a compression spring surrounding said rod at a location between said collar portion and a housing portion of said pneumatic cylinder, said compression spring being trapped between said housing portion and said collar portion.

3. An apparatus according to claim 2 and further comprising:

mounting means for adjustably mounting said pneumatic cylinder in relation to said pivoting bracket.

4. An apparatus according to claim 2 and further comprising:

linkage means for connecting said spring means to said pivoting bracket.

5. An apparatus according to claim 4 wherein said linkage means comprises:

a first link having a first end pivotably attached to said pivoting bracket and a second end pivotably attached to said rod end of said cylinder rod of said pneumatic cylinder; and a second link having a first end pivotably attached to said adjustable stop means, a second end and a longitudinal slot adjacent said second end of said second link, said second end of said first link being slidable in said slot of said second link.

6. An apparatus according to claim 2 wherein said rod clevis means further comprises:

a free end portion fixedly secured to a free end of said cylinder rod; and a clevis end portion pivotably secured to said pivoting bracket;

said collar portion being disposed between said free end portion and said clevis end portion.

7. An apparatus according to claim 6 wherein said free end portion, and said clevis end portion of said rod clevis means are formed in a single piece.

8. An Apparatus according to claim 1 wherein:

said pneumatic means comprises a cylinder having a housing and a cylinder rod extending from said housing, said cylinder rod being reciprocable with respect to said housing and having a collar attached thereto; and wherein said means for cushioning comprises a compression spring circumscribing said cylinder rod at a location between said housing and said collar.

* * * * *